(12) United States Patent
Mitrovic (10) Patent No.: US 8,641,343 B2
(45) Date of Patent: Feb. 4, 2014

(54) THREADED CONNECTOR FOR POLE, MACHINERY AND STRUCTURAL ELEMENTS

(75) Inventor: Milan Mitrovic, Mississauga (CA)

(73) Assignee: Studio Milan Design Build, Inc., Mississauga, Ontario (CA)

( * ) Notice: Subject to any disclaimer, the term of this patent is extended or adjusted under 35 U.S.C. 154(b) by 384 days.

(21) Appl. No.: 12/978,794

(22) Filed: Dec. 27, 2010

(65) Prior Publication Data

US 2011/0158766 A1    Jun. 30, 2011

Related U.S. Application Data

(60) Provisional application No. 61/290,584, filed on Dec. 29, 2009.

(51) Int. Cl.
*F16B 21/00*    (2006.01)

(52) U.S. Cl.
USPC ............... 411/338; 411/44; 411/55; 411/384; 411/389

(58) Field of Classification Search
USPC ........... 411/44, 55, 60.2, 80.6, 338, 349, 360, 411/366.1, 384, 389, 403, 432, 550, 551
See application file for complete search history.

(56) References Cited

U.S. PATENT DOCUMENTS 3,227,031 A * 1/1966 Williams ........................ 411/26
4,094,223 A * 6/1978 Fischer ........................... 411/44
4,326,826 A * 4/1982 Bunyan ......................... 411/339
4,334,815 A * 6/1982 Knohl ........................... 411/368
4,475,329 A   10/1984 Fischer (Continued)

FOREIGN PATENT DOCUMENTS

EP    0079343 A1    5/1983
GB    2428699 A     2/2007

(Continued)

OTHER PUBLICATIONS

Glass Rail Standoff Fittings Product Information Sheet, C.R. Laurence of Canada. Believed to have been offered for sale, publicly used, and/or published prior to the filing date of this application.

*Primary Examiner* — Roberta Delisle
(74) *Attorney, Agent, or Firm* — Gifford, Krass, Sprinkle, Anderson & Citkowski, P.C.

(57) ABSTRACT

Threaded connectors for securing a structure such as a post or pole to a support are disclosed. In one embodiment, an anchor has a passageway that is threaded for at least a portion of its length. An elongate connecting member has a relatively wide central section and threaded first and second sections extending from opposite sides of the central section. The first section is threadable into the passageway to secure the connecting member to the anchor. The connecting member is formed with a turning formation at its outer end so that it can be engaged with a turning tool in order to thread the connecting member into or out of the passageway. A nut is part of the connector and can be threaded onto the second section in order to secure the structure. Another version of the connector has a flanged nut having a flange spaced from the outer end of the nut, which is threadable onto a threaded connecting member. The nut is formed with a turning formation for engagement with a tool so that the nut can be turned to adjust the nut's position.

13 Claims, 7 Drawing Sheets

(56) References Cited

U.S. PATENT DOCUMENTS

| | | | |
|---|---|---|---|
| 4,603,526 A | 8/1986 | Bollmann | |
| 4,614,070 A | 9/1986 | Idland | |
| 4,690,365 A * | 9/1987 | Miller et al. | 248/650 |
| 5,131,621 A * | 7/1992 | Sdano | 248/680 |
| 5,333,978 A * | 8/1994 | Rives | 411/389 |
| 5,452,880 A | 9/1995 | Bailey | |
| 5,511,760 A | 4/1996 | Kambara | |
| 5,645,271 A | 7/1997 | Nunez | |
| 5,666,779 A | 9/1997 | Fuchs et al. | |
| 5,685,678 A * | 11/1997 | Giannuzzi et al. | 411/55 |
| 6,131,346 A * | 10/2000 | Kordes | 52/235 |
| 6,554,542 B2 | 4/2003 | Mano et al. | |
| 6,625,945 B2 | 9/2003 | Commins | |
| 6,652,207 B2 | 11/2003 | Gauthier | |
| 6,748,717 B2 | 6/2004 | Sumner, Sr. | |
| 6,817,817 B2 * | 11/2004 | Dembowsky et al. | 411/369 |
| 7,007,432 B2 | 3/2006 | Commins | |
| 7,241,097 B2 * | 7/2007 | Dembowsky et al. | 411/369 |
| 7,357,613 B2 * | 4/2008 | Houck et al. | 411/60.3 |
| 7,441,743 B2 | 10/2008 | Behlinger et al. | |
| 7,506,479 B2 | 3/2009 | Pryor | |
| 7,509,778 B2 | 3/2009 | Leek | |
| 7,513,083 B2 | 4/2009 | Pryor et al. | |
| 7,752,944 B2 | 7/2010 | Wallek | |
| 2001/0046416 A1 | 11/2001 | Mano et al. | |
| 2004/0253075 A1 * | 12/2004 | Liebig et al. | 411/57.1 |
| 2006/0059812 A1 | 3/2006 | Simmons | |
| 2006/0104742 A1 * | 5/2006 | Fleming | 411/389 |
| 2006/0260232 A1 | 11/2006 | Crawford et al. | |
| 2009/0184302 A1 | 7/2009 | Begin | |

FOREIGN PATENT DOCUMENTS

| | | |
|---|---|---|
| WO | WO-9324712 A1 | 12/1993 |
| WO | WO-2006116295 A2 | 11/2006 |
| WO | WO-2007019414 A2 | 2/2007 |

\* cited by examiner

THREADED CONNECTOR FOR POLE, MACHINERY AND STRUCTURAL ELEMENTS

PRIOR APPLICATION

This application claims priority on basis of previously filed U.S. Provisional Patent Application No. 61/290,584 filed Dec. 29, 2009.

This invention relates to threaded connectors for securing a structure such as a post, pole or panel to a support.

BACKGROUND

Posts and poles, such as long utility poles, can be difficult to mount on a supporting surface such as a concrete base so that they are truly vertical. Because of this difficulty, special base attachments have been developed to allow the orientation of the post or pole to be adjusted after it is first mounted on the concrete base. However, the known systems can be fairly complex and relatively expensive.

It is also often necessary to mount machinery, such as manufacturing equipment, so that the base of the machine is completely horizontal and various connectors have been developed for this purpose. For example, U.S. Pat. No. 7,441,743 issued Oct. 28, 2008 to ALSTOM Technology Ltd. describes a fastening arrangement for a machine base, this arrangement being connected to and supported by a concrete base into which extends an inner anchor shank. A steel foundation plate is mounted on the concrete base and the machine base is mounted on top of this plate. A so-called anti-fatigue bolt/stud connects the machine base to the foundation and is screwed into the top end of the anchor shank. A securing nut can be threaded onto the threaded upper end of the bolt/stud.

U.S. Pat. No. 5,645,271 issued Jul. 8, 1997 to M. D. Nunez describes a mechanism for adjusting the vertical orientation of a fence post assembly having a flat mounting plate located at the bottom end of the post. A pair of bolts 50 pass through openings in the plate and are used to mount the plate to a concrete pad or slab. Two or more spaced apart levelling bolts extend through respective holes in the plate. By adjusting the position of these bolts or screws, the plate can be levelled on an uneven surface so that the vertical axis of the post is vertical.

Special mounts have also been developed for attaching panels, such as glass panels, that can be used along elevated railings or stairways. Special mountings of these types are available from the company CRL. These glass sheet mounts are provided with a mounting plate and attached to a surface of this plate are cylindrical steel connectors which can be made of stainless steel and which are internally threaded. These connectors can be connected to the mounting plate by centrally located screws that extend through the plate and they are provided with a pair of round caps that can be threaded into the central holes of the connectors. The inside surface of each cap engages one side of the glass sheet and acts to press the sheet against the cylindrical portion of the connector. The cylindrical steel connectors are sometimes referred to as standoffs and a surface to which they are connected is sometimes referred to as fascia.

It is important that the aforementioned glass panels are installed so that they are plumb and in line with one another. Small imperfections on the mounting surface or fascia may result in vertical misalignment of the standoffs and difficulties in lining up the panels. Although a shimming process can sometimes be used to alleviate these problems, it is not a very accurate method and often requires that the already mounted glass panel be taken off its connectors in order to give access to the mounting connectors. Another difficulty with the installation of these panels is that the mounting surface or fascia and/or the glass panels can easily be damaged.

Accordingly, there is a need for improved threaded connectors, which can be used to secure a structure such as a post, pole or panel to a support base or support surface and which will also allow some adjustment to the position of the structure during the mounting process.

SUMMARY OF THE DISCLOSURE

According to one embodiment of the present disclosure, a threaded connecting mechanism for securing a structure to a support and adjusting the position of the structure relative to the support, the structure having a mounting member with a mounting opening formed therein, includes an anchor member having a passageway formed therein and extending to one end of the anchor member. This passageway is threaded for at least a portion of its length. The connecting mechanism also has an elongate, one-piece connecting member having first and second opposite ends, a relatively wide section spaced from the opposite ends, and relatively narrow, externally threaded first and second sections extending from opposite sides of the central section. The relatively wide section is integrally connected to the externally threaded first and second sections. The first section is threadable into the passageway of the anchor member to secure the connecting member to the anchor member, and the second section is adapted and sized for insertion through the mounting opening in order to mount the mounting member on the opposite second side of the wide section and formed with a turning formation for turning the connecting member about a central longitudinal axis thereof. The turning formation is located at the second end. The connecting mechanism further includes a threaded nut threadable onto the second section in order to secure the mounting member of the structure to the connecting member. During use of the connecting mechanism, the turning formation is engageable with a turning tool in order to thread the connecting member into or out of the passageway and thereby adjust the position of the structure.

In an exemplary embodiment of this connecting mechanism, the turning formation is a non-circular socket formed in the second end.

According to another embodiment of the present disclosure, a threaded connecting mechanism for securing a structure to a support and adjusting the position of the structure relative to the support includes an externally threaded connecting member having first and second opposite ends and adapted for connection to the support so that a threaded portion thereof projects from the support. There is also a flanged nut having a threaded passageway formed therein, a central longitudinal axis, and an annular flange extending radially outwardly relative to the longitudinal axis. The flange is located at an inner end of the nut and has a bearing surface for supporting the structure facing away from the inner end. The nut has a narrower portion extending from the flange to an outer end of the nut and has a turning formation on the narrower portion. The nut is threadable onto the threaded portion of the connecting member so as to leave a threaded end section projecting from the outer end of the nut when the connecting member is affixed to the support. A second nut is threadable onto the threaded end section in order to secure the structure to the connecting member. During use of this connecting mechanism, the turning formation is engageable with a turning tool in order to thread the flanged nut closer to or further from the support and thereby move the structure towards a desired position.

In one particular embodiment of this connecting mechanism, the threaded connecting member is elongate and has threads extending from its first end to the opposite second end.

According to yet another embodiment of the present disclosure, a connecting mechanism for securing a structure to a rigid support by means of an internally threaded nut allows an initial position of the structure relative to the support to be adjusted. This structure has a mounting opening former therein. This connecting mechanism includes an attachment device forming a passageway extending to at least one end of the device and being at least partially threaded along the length of the passageway. The mechanism further includes a one-piece connecting member having first and second opposite ends, a relatively wide section spaced from these opposite ends, a relatively narrow externally threaded first section extending from a first side of the wide section to the first end, and a relatively narrow externally threaded second section extending from an opposite side of the wide section to the second end. The relatively wide section is integrally connected to the first and second section. The first section is threadable into the passageway to secure the connecting member to the attachment device. The second section is adapted and sized for insertion through the mounting opening in order to mount the structure on the opposite second side of the wide section and formed with means for turning the connecting member about a central longitudinal axis thereof. The turning means is located in the region of the second end. During use of this connecting mechanism, the turning means is engageable with a turning tool to thread the connecting member into or out of the passageway in order to adjust the position of the structure from the initial position towards a desired position. The threaded nut can be threaded onto the second section to secure the structure to the connecting mechanism.

In a particular version of this mechanism, the turning means is a non-circular socket formed in the second end and the wide section is approximately mid-way along the length of the connecting member with the first and second sides of the wide section being flat and annular.

According to a still further embodiment of the present disclosure, a connector for securing a structure to a rigid support by means of an internally threaded nut allows an initial position of the structure relative to the support to be adjusted and comprises an integral connecting member having first and second opposite ends and a relatively wide section spaced from these opposite ends. The connecting member also has a first section extending from a first side of the wide section to the first end and forming a screw-like thread which tapers to a point. There is also an externally threaded second section extending from an opposite second side of the wide section to the second end. This second section is made with means for turning the connecting member about a central longitudinal axis thereof. The turning mechanism is located in the region of the second end. During use of this connector, the turning mechanism is engageable with a turning tool to screw the connecting member into or out of the rigid support in order to adjust the position of the structure from the initial position towards a desired position. Also the threaded nut can be threaded onto the second section to secure the structure to the connector.

These and other aspects of the disclosed threaded connecting mechanisms and connectors will become more readily apparent to those having ordinary skill in the art from the following detailed description taken in conjunction with the accompanying drawings.

BRIEF DESCRIPTION OF THE DRAWINGS

So that those having ordinary skill in the art to which the present disclosure pertains will more readily understand how to make and use the subject invention, exemplary embodiments thereof will be described in detail herein below, with reference to the following drawings.

DETAILED DESCRIPTION OF EXEMPLARY EMBODIMENTS

Figure 1:
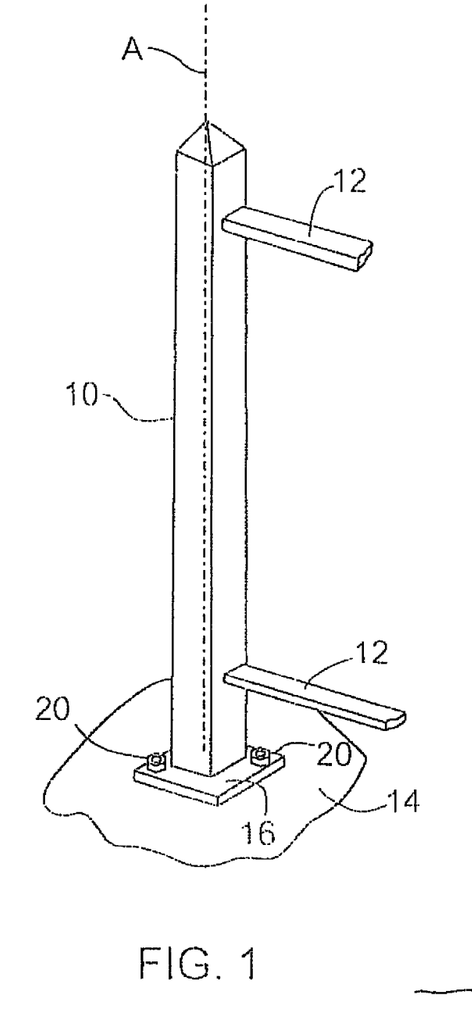
FIG. 1 is a perspective view of a fence post mounted on a concrete base, two vertical sides of the post being shown as well as its mounting plate.

Shown in FIG. 1 is a fence post 10 of standard construction. The post is elongate and extends vertically in the usual case along a vertical, central axis indicated at A. It is important that the post be as upright and vertical as possible in order that the fence may have a pleasing appearance and that it may connect properly with fence rails 12 that are attached to the post and extend horizontally. Commonly, but not shown in FIG. 1, a number of fence pickets or fence bars extend vertically between the rails and are supported thereby. When the fence is mounted on the ground, it is common to mount the bottom end of the post on a concrete base indicated at 14, which is arranged in a hole dug in the ground. The illustrated post is mounted on a concrete base having a flat upper surface for supporting the post. Rigidly and securely attached to the bottom of the post is a square mounting plate 16, which can, for example, be a solid plate or a plate with a central opening over which the post is mounted. The plate can be attached to the bottom of the post by welding. The post is rigidly and adjustably mounted on the concrete base 14 by means of threaded connecting mechanisms 20 described in detail below. Although only two such connecting mechanisms or connectors are shown in FIG. 1, it will be appreciated that more connectors, for example four connectors located at the four corners, can be provided, if desired. As explained below, because the position of each of these connectors is adjustable, the orientation of the post itself can be adjusted so that its central axis A is vertical or plumb.

Figure 2:
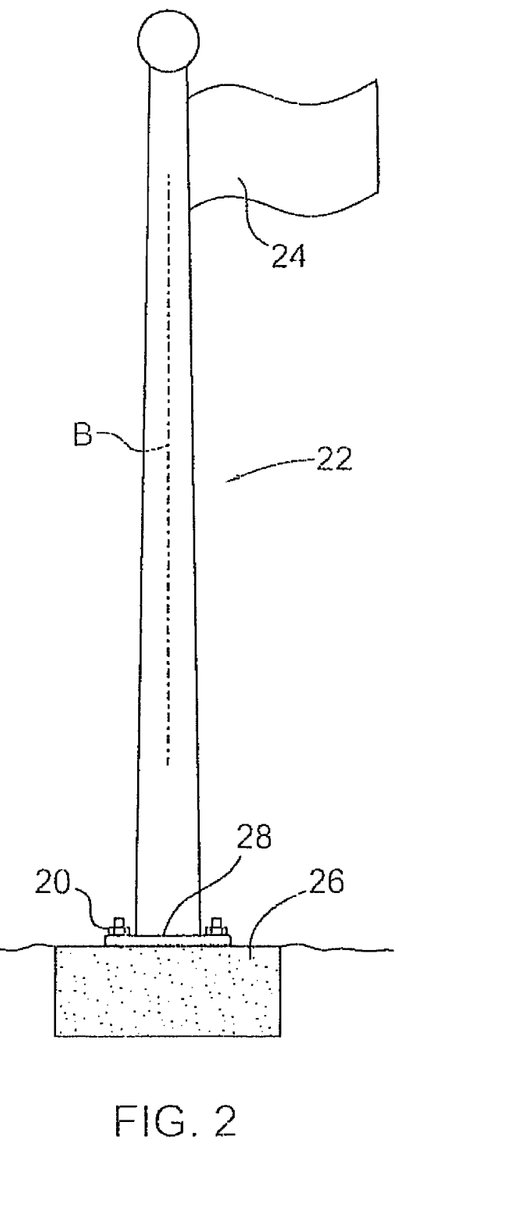
FIG. 2 is a side view of a flag pole mounted on a concrete base located in the ground.

FIG. 2 illustrates another possible use of the threaded connecting mechanisms constructed in accordance with the present disclosure. Shown in this figure is an elongate flag pole 22, on the top of which is mounted a flag 24. It will be appreciated that the flag pole can be substantially longer than a fence post and can, in fact, be 20, 30 or more feet high. The pole extends along a central, vertical axis indicated at B. Again, for appearance purposes and for the pole to be supported properly, the central axis B should be as vertical as possible. The illustrated pole is mounted on a concrete base 26, which is sufficiently large and heavy to support the pole and keep it upright. Rigidly connected to the bottom of the pole is a mounting plate 28, which can be securely fastened to the concrete base by a plurality of threaded connectors or connecting mechanisms 20, constructed according to the present disclosure. The connectors 20 for the pole can be made larger than those connectors used for shorter, lighter fence posts or a greater number of the connecting mechanisms can be used for mounting the pole.

Figures 3, 4, 5:
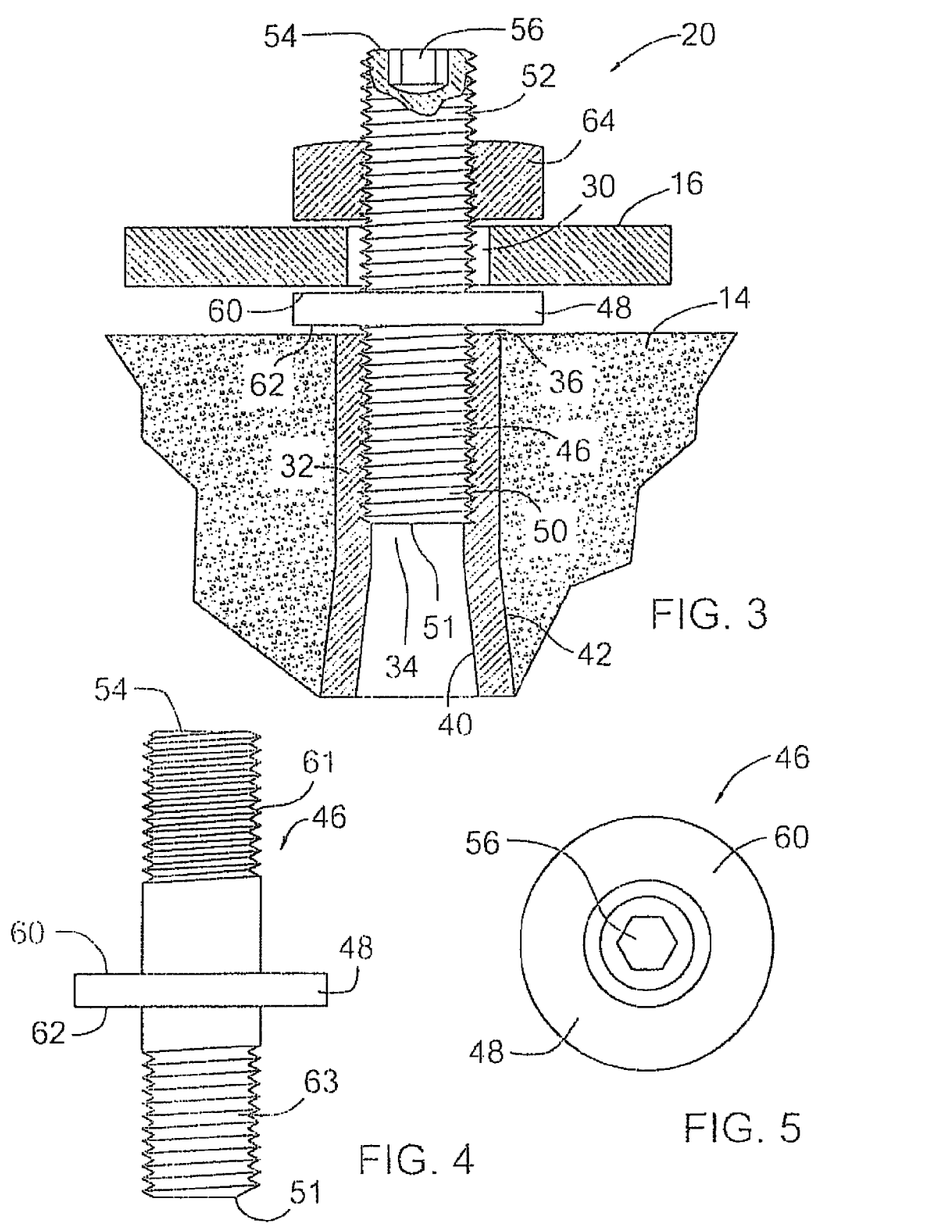
FIG. 3 is an axial, vertical cross-section of a first embodiment of a threaded connecting mechanism according to the present disclosure.
FIG. 4 is a side view of one version of an elongate connecting member usable in the embodiment of FIG. 3.
FIG. 5 is a top end view of the connecting member of FIG. 4.

A first exemplary embodiment of a threaded connecting mechanism 20 constructed in accordance with the present disclosure is illustrated in FIG. 3. The connector 20 is used to secure a structure such as the illustrated support plate 16 corresponding to the plate shown in FIG. 1. Only a portion of the plate 16 is shown in FIG. 3 and it is shown in cross-section taken through the center of a connector hole 30 formed in the plate. The threaded connecting mechanism 20 includes an anchor member 32 having a passageway 34 formed therein and extending to at least one end 36 of the anchor member. The illustrated axial passageway extends to both ends of the anchor member and it is threaded for at least a portion of its length. The anchor member 32 has an unthreaded section 40 of the passageway but it will be understood that the entire length of the passageway can be threaded, if desired. The exemplary anchor shown has an outwardly expanding end section 42 at its bottom end to increase the holding power of the anchor in the concrete base.

It will be understood that the concrete base can take various forms, depending on its particular function and location. For example, the base 14 can be in the form of a concrete block or a poured concrete floor. Some types of anchor members are properly positioned and held at the floor or base site prior to the liquid concrete being poured. The anchor member can take different forms. It can also be a drop anchor which is applied on already poured concrete. It is also possible for the supporting base to be a solid wood structure, in which case the anchor member can take the form of a metal insert suitable for placement in a hole formed in the wood. This metal insert is formed with an internally threaded hole.

Another component of this threaded connecting mechanism 20 is an elongate connecting member or stud 46 having a relatively wide central section 48 and externally threaded first and second sections 50, 52 extending from opposite sides of the central section and being narrow relative to the central section. The connecting member has a first end 51 and an opposite second end 54. The first section 50 is threadable into the passageway 34 to secure the connecting member to the anchor member. The first section extends from a first side of the wide section 48 to the first end 51. The second section 52 forms the distal second end 54 spaced from the central section 48 and extends from an opposite second side of the wide section. As shown, the first and second sections 50, 52 are substantially equal in length but it will be appreciated that they can be of different lengths depending on the particular use of the threaded connecting mechanism and other factors such as the thickness of the mounting plate 16.

A turning formation 56 is formed in the connecting member at the second end 54 and, during use of the connector, this turning formation 56 is engageable with a turning tool (not shown) in order to thread the connecting member into or out of the passageway 34. In the illustrated exemplary embodiment, the turning formation is a non-circular socket, in particular a multi-sided socket into which can be inserted the end of a tool such as an Allen key. If the connecting member is extending vertically, then the height of the central section 48 and its top surface 60 can be adjusted in this manner. Initially, the bottom surface 62 can be spaced apart as shown in FIG. 3 from the top of the concrete base 14 so that later the height of the central section can be adjusted in either direction that is either upwardly or downwardly. Once the connecting member has been threaded into the anchor member to a suitable initial position, the mounting plate 16 can be placed onto the connecting member with its second section 52 extending through the hole 30. It will be noted that the diameter of the central section 48 is larger than the diameter of the hole 30 so that the plate will rest on top surface 60.

FIG. 4 illustrates a variation of the connecting member 46 wherein the threads on the first and second sections do not extend their entire length. The threads 61 are spaced from the central section 48 as are the upper threads 63.

A third component of the threaded connector 20 is a standard threaded nut 64, which can be formed with multiple sides so that it can be turned and tightened with a tool such as a wrench. The nut is fitted onto the second section 52 above the mounting plate 16 and thus secures the mounting plate to the connecting member. It will be understood that several of the threaded connecting mechanisms 20 with their respective connecting members 46 can be used to mount a structure such as a post, pole or machine. With the use of the present connectors, once the connecting members have been inserted through their respective holes in the mounting plate or in mounting flanges or in other types of mounting structure, it is still possible to adjust the position of the mounting plate or mounting flanges or mounting structure by rotation of one or more of the connecting members about their axes. Once the post, pole or machine is properly positioned and properly oriented, the nut 64 is threaded onto the second section 52 of each connecting member until it tightly engages the top of the mounting plate or mounting flange.

In one variation of the connecting arrangement shown in FIG. 3, a circular recess can be formed on the bottom side of the mounting plate 16. This recess is sized to receive the central section 48 so it cannot be seen after the post, pole or machine has been adjusted to its final position. This construction may provide a more pleasing appearance to the overall assembly.

Figure 6:
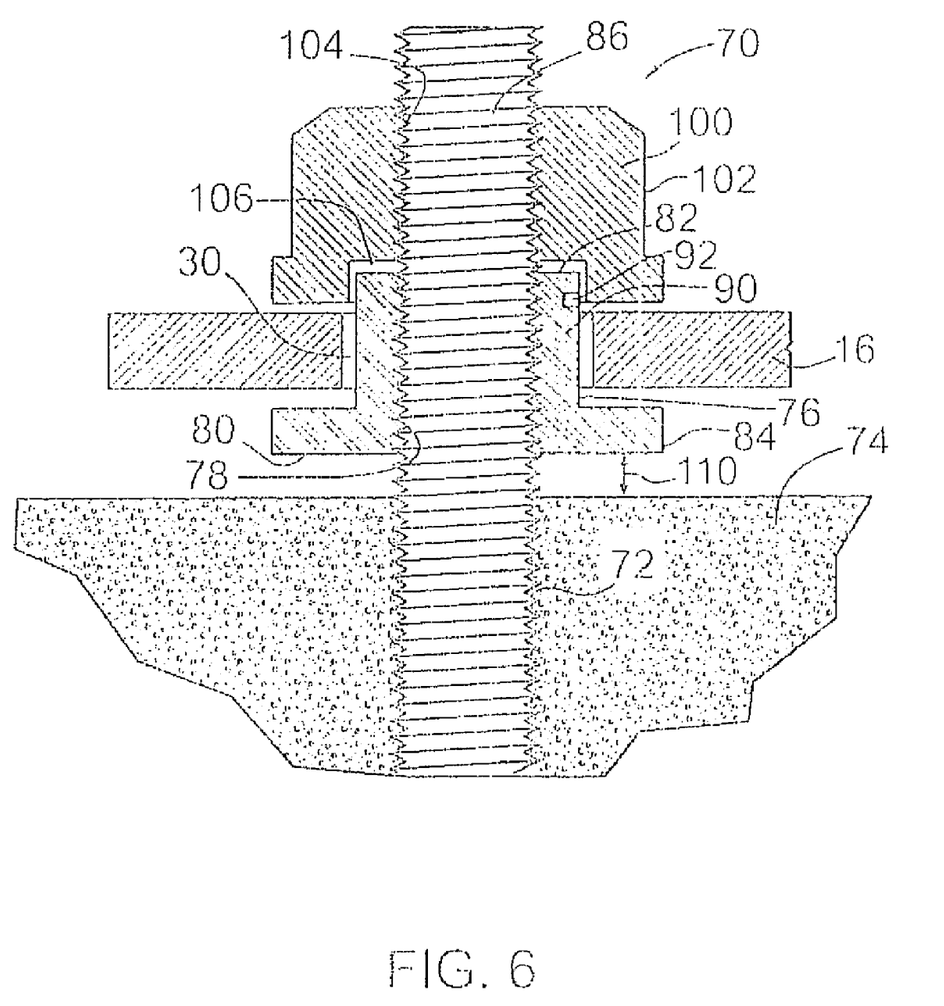
FIG. 6 is a vertical cross-section of a second embodiment of a threaded connecting mechanism constructed in accordance with the present disclosure.

A second exemplary embodiment of a threaded connecting mechanism constructed in accordance with the present disclosure is illustrated in FIG. 6 and is indicated generally by reference 70. This connecting mechanism again can be used to secure at the desired height and in the desired position a mounting plate 16 which can be part of a post, pole or machine. This connector includes an elongate anchor or connecting member 72 having external threads formed thereon. As illustrated, these threads extend from a first end to an opposite second end thereof. The anchor member extends into a supporting base 74 which can take a variety of forms and be made of a variety of materials such as concrete or steel. In the case of concrete, the anchor is held in place by a suitable holding arrangement while the liquid concrete is being poured. In the case of a metal base, the metal block or plate can be formed with a threaded hole to receive the anchor member. It will be appreciated by those skilled in the art that the anchor member can take a variety of forms different from that illustrated in FIG. 6. The anchor can, for example, be a wedge anchor, a hangar bolt, a rivet stud or any other male-threaded stud that can be rigidly and firmly attached to the base.

The connector 70 also includes flanged nut 76, which can also be identified as a levelling nut. This nut is internally threaded, has a central longitudinal axis, and is formed with a central passageway 78 that extends from a bottom 80 of the nut to a top end 82. The bottom of the nut can also be referred to as an inner end of the nut while the top end can be referred to as an outer end. The annular flange 84 of the nut as illustrated extends in a circumferential direction completely around the nut and is spaced from the outer or top end 82 of the nut. The exemplary nut has its flange 84 located at the inner end of the nut and the flange has a bearing surface for supporting the structure facing away from its inner end. The nut 76 is threaded onto the connecting member so as to secure the nut on the connecting member in a selected position, with an outer end section 86 of the anchor member projecting from the outer or top end of the nut. It will be appreciated that the nut has a relatively narrower portion 90 extending between the flange and the outer end 82. The diameter of the flange is greater than that of the hole 30 formed in the mounting plate 16 and through which the narrow portion of the nut must extend for connecting purposes. Also the height of the narrow portion should usually exceed the thickness of the mounting plate 16 so that an upper end section of the narrow portion projects from the top of the mounting plate.

The nut is formed with a turning formation, indicated generally by reference 92 for engagement with a nut-turning tool whereby, during use of this connecting mechanism, the nut can be turned by the tool in order to adjust the nut's position after the structure (such as the plate 16) has been placed onto the nut and adjacent the flange 84. Thus the tool (not shown) can be used to thread the flanged nut closer to or further from the support or base 74. The turning formation 92 can take a variety of forms, depending upon the tool to be used. It should be understood that the term "turning formation" as used herein includes one or more recesses, one or more slots, or a socket arrangement. Although only one flat sided recess is shown in FIG. 6, it will be appreciated that there can be a plurality of such recesses distributed about the circumference of the nut. Not only can the turning formation, such as a recess or recesses, be formed in the cylindrical side wall of the nut, but it is also possible that the turning formation is formed in the top end 82.

The third component of the connector 70 is a second nut 100 which can be referred to as a finishing nut since, at least in some applications of the connecting mechanism, this nut can be seen after final assembly. The second nut 100 has a non-circular perimeter 102 so that it can be rotated with a suitable tool such as a wrench. For example, the nut can have six equal sides extending about its circumference. A threaded passage 104 extends through this nut from the bottom side to the top side. The nut 100 is formed with an annular bottom recess 106 located at the inner end of the nut extending around the threaded passageway 104 and it is sized to accommodate and receive a top portion of the nut 76. Thus, the recess 106 has a diameter at least as great as a maximum width of the narrower portion 90. The nut 100 is able to be tightened by turning so that it can secure the structure, in this case the mounting plate 16, to the connecting mechanism 70.

In order to use the threaded connector 70 of FIG. 6, the connecting member 72 is first rigidly secured in the base which, as indicated, is typically concrete, wood, or metal. The flange nut 76 is then threaded on to the connecting member to a suitable position that should allow for some subsequent adjustment. This initial position for the nut can provide for a gap 110 between the bottom of the nut and the base. The structure to be anchored, which can include for example the mounting plate 16, is then placed on top of the connecting member and the nut 76 so that it rests on the flange 84 of the nut. In many cases, there will be several of the connecting mechanisms 70 used to secure a particular structure such as a post or pole. In this situation, the mounting plates or mounting flanges of the structure are placed over all of the connecting members and their respective nuts at the same time in order to mount the structure. Once the structure rests on the flanges of the nuts, a turning tool is then engaged with the turning formation to rotate the respective nut and thereby orient the structure in the required upright or horizontal position. Once the proper orientation has been achieved, the finishing nut or nuts 100 are threaded onto their respective connecting members to hold the structure in position.

Figure 7:
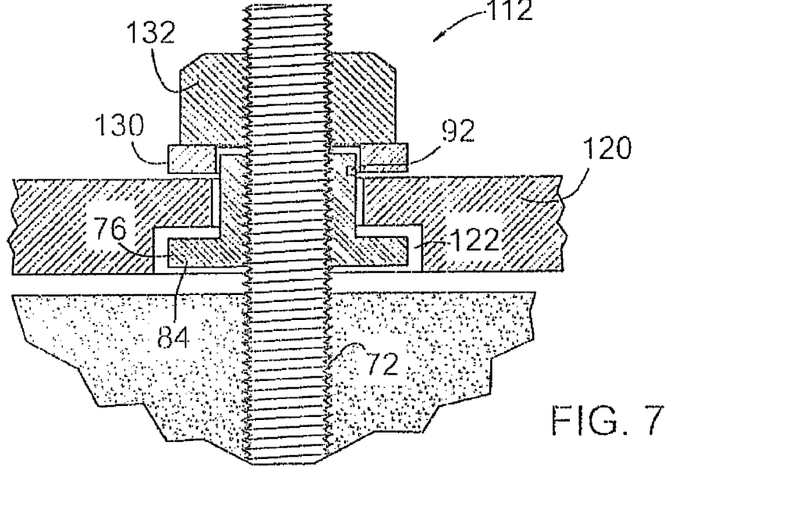
FIG. 7 is a vertical cross-section of a variation of the connecting mechanism of FIG. 6.
Figure 8:
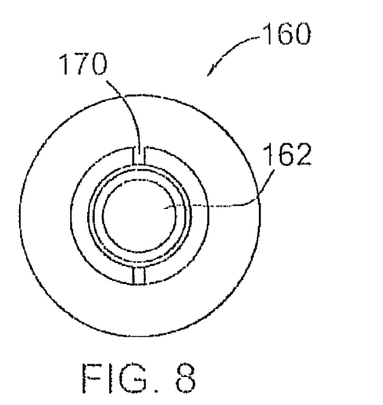
FIG. 8 is a top view of one form of flanged nut usable in the mechanism of FIG. 6 or FIG. 7.
Figure 9:
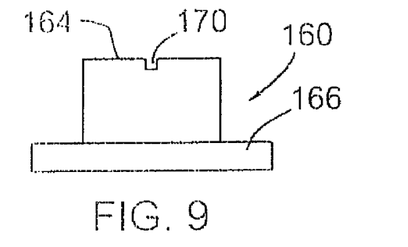
FIG. 9 is a side view of the flanged nut of FIG. 8.
Figure 10:
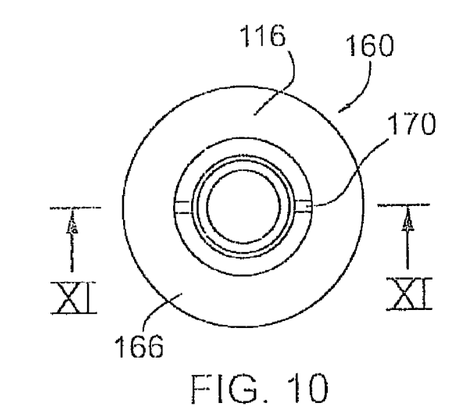
FIG. 10 is another top view of the flanged nut of FIG. 8.

Another embodiment of a threaded connecting mechanism constructed according to the present disclosure is illustrated by FIG. 7. This threaded connecting mechanism is indicated generally by reference 112 and is a variant of the threaded connector of FIG. 6. This threaded connecting mechanism also includes an elongate connecting member or anchor 72 which is externally threaded and a flanged nut 76, which is shown separately in FIGS. 12 to 14 with a variant thereof illustrated in FIGS. 8 to 11. This flanged nut or levelling nut has a circumferentially extending flange 84 located at its bottom end. The user can rest on this flange a mounting plate 120 which can of course be connected to a structure such as a post, pole or machine. However, unlike the mounting plate 16, the plate 120 is formed with an annular bottom recess 122, which acts to hide the flange 84 by receiving same when the mounting plate is in place on the nut.

In the nut 76, the turning formation comprises two recesses or notches 124 (only one of which is shown) located at the top end of the narrower portion 90 of the nut. These notches are located on diametrically opposite sides of the nut and they can be engaged by a suitable tool (not shown) in order to thread the nut downwardly or upwardly on the anchor member 72.

Once the mounting plate 120 has been arranged on the flange of the nut 76, a suitable flat washer 130 can be placed around the top end of the nut and on top of the plate 120. A second nut 132 is then threaded onto the projecting end of the anchor member 72 and engages the top of the washer to hold the mounting plate securely in place.

Figure 11:
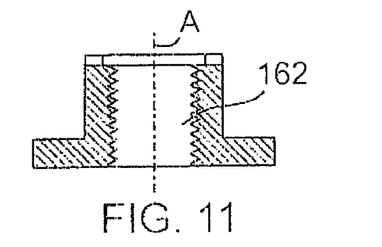
FIG. 11 is an axial cross-section taken along the line XI-XI of FIG. 10.
Figures 12, 13, 14:
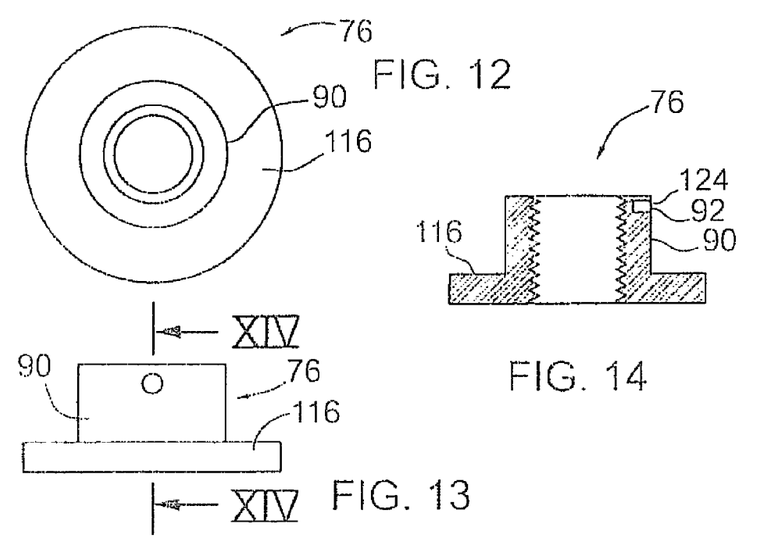
FIG. 12 is a top view of another form of flanged nut usable in the mechanism of FIG. 6 or FIG. 7.
FIG. 13 is a side view of the flanged nut of FIG. 12.
FIG. 14 is an axial cross-section of the flanged nut taken along the line IV-XIV of FIG. 13.

FIGS. 8 to 11 illustrate an alternate form of flanged nut that can be used with the connecting mechanism of FIG. 6 or FIG. 7. This flanged nut 160 is internally threaded as shown in FIG. 11 and has a central longitudinal axis A. A central passageway 162 extends from a bottom end of the nut to a top end 164. An annular flange 166 extends circumferentially around the nut and is located at the inner end of the nut. This nut 160 also has a turning formation, this formation being located at the top end 164. In particular, the turning formation comprises two squared notches 170 which are located on opposite sides of the nut. As in the case of the flanged nut 76, the flanged nut 160 can be engaged by a nut turning tool, in this case one designed to engage the two notches 170 in order to adjust the nut's position after the structure has been placed onto the nut and adjacent the flange 166.

Figure 15:
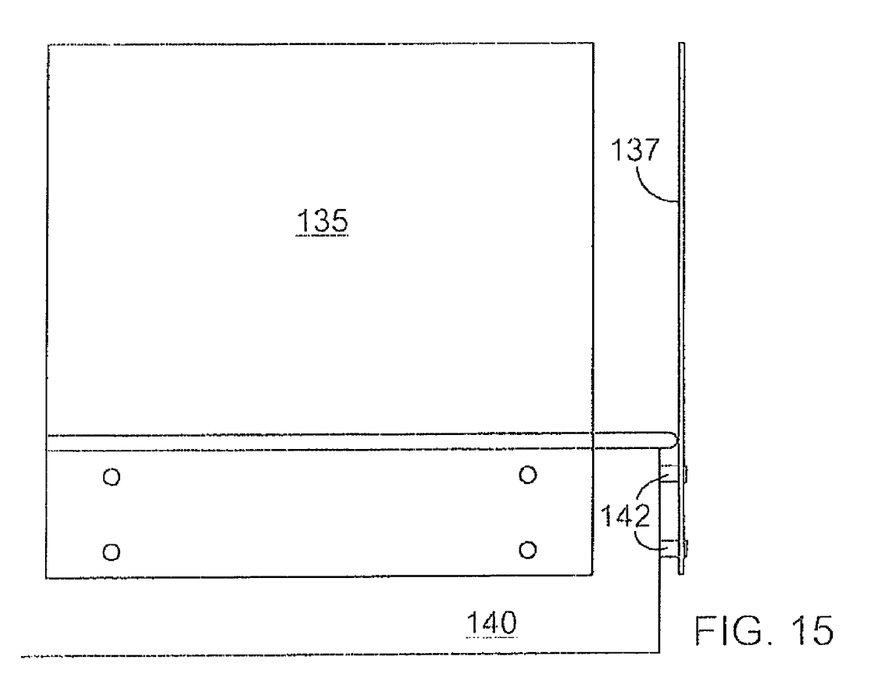
FIG. 15 is an elevational view of two glass panels, one of which is shown edgewise, the panels being mounted to a balcony using threaded connectors constructed according to the present disclosure.
Figure 16:
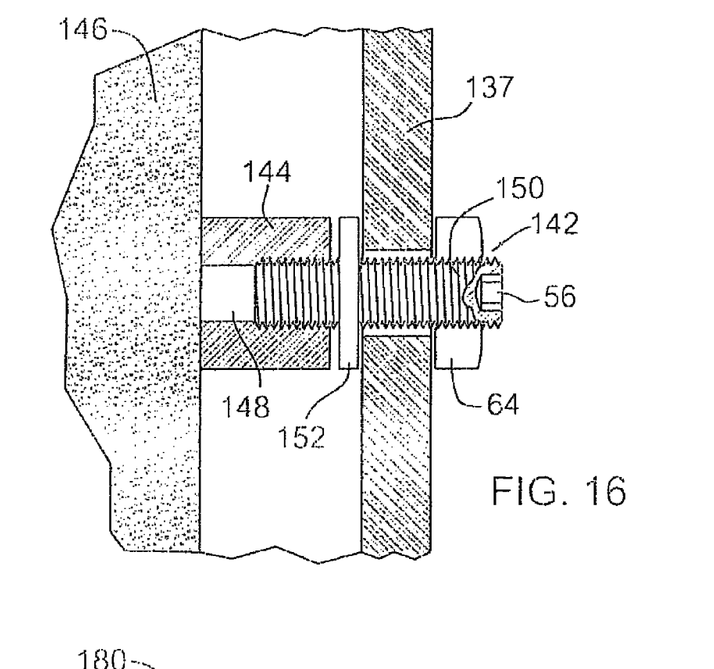
FIG. 16 is a cross-sectional view illustrating one of the panel connectors of FIG. 15 extending through one glass panel.

FIGS. 15 and 16 illustrate another use of threaded connectors constructed in accordance with the present disclosure. Shown in FIG. 15 are two rectangular glass panels indicated by references 135, 137, with the panel 137 being shown edgewise. Panels of this type are generally made of strong, thick glass in order that they are strong enough to serve the desired purpose. For example, tempered glass ½ inch thick or thicker is generally used for glass balustrades. The illustrated panels are shown connected to two sides of a balcony 140 but such panels can also be mounted along a mezzanine, a roof, or a stairway. It is common to mount these panels using two rows of connectors as shown in FIG. 15, including an upper row and a lower row. Connecting mechanisms constructed according to an exemplary embodiment of this disclosure are indicated generally by reference 142 and, as shown in FIG. 15, these threaded connecting mechanisms are anchored in the sides of a balcony, these sides sometimes referred to as fascia.

The details of the connecting mechanism 142 can be seen more clearly from FIG. 16 in which the connecting mechanism is shown partially in cross-section. The threaded connecting mechanism includes a cylindrical anchor member 144 which is rigidly connected to the fascia support 146 and which is sometimes called a standoff. The anchor member can be embedded in the support or can be attached thereto by a mounting plate (not shown). The anchor member 144 has a passageway 148 formed therein which is threaded in order to receive part of elongate connecting member or stud 150. The stud 150 can be similar in its construction to the connecting member 46 illustrated in FIG. 3 and it has a relatively wide central section 152. Omitted from FIG. 16 for ease of illustration are standard glass-protecting plastic washers, which can be located on opposite sides of the glass panel 137. The glass panel is placed over the adjustable studs or connecting member 150 of a suitable number of the threaded connecting mechanisms. The back side of the panel is placed against the wide central section 152 (subject to the aforementioned plastic washer being between them). The position of the connecting member 150 is then adjusted by means of a turning tool, which engages the end socket 56 located in the outer end of the stud. In this way, the glass panels can be vertically and horizontally aligned prior to attachment of the nuts 64, which are threaded onto their respective connecting members or studs in order to press against the front side of the glass panel and thereby press the back side of the panel against the central sections of the studs.

In an alternative construction, the nuts 64 can be constructed in the form of caps so that the stud sockets 56 are not visible (if desired).

Figures 17, 18:
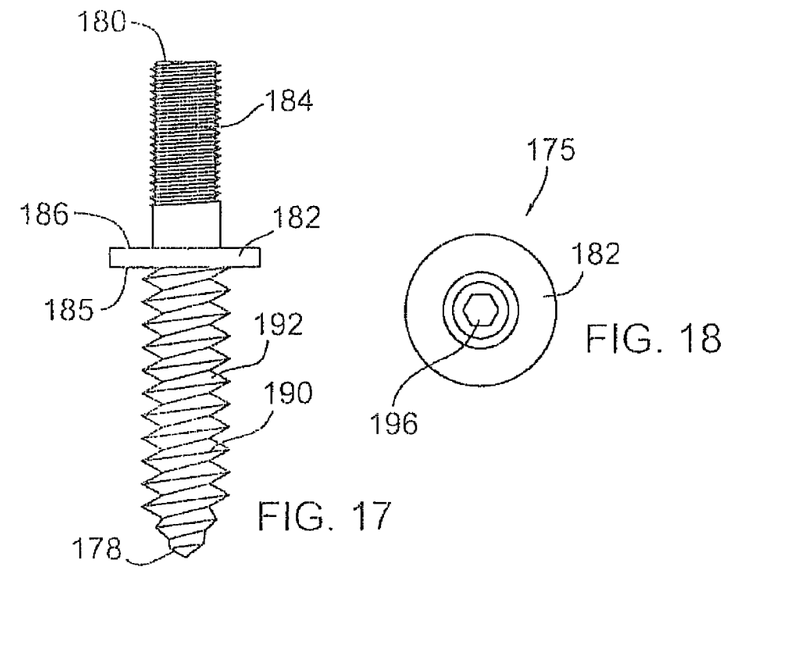
FIG. 17 is a side view of a hanger bolt according to the present disclosure.
FIG. 18 is a top end view of the hanger bolt.

FIGS. 17 and 18 illustrate a so-called hanger bolt 175 which is particularly useful when the support to which the structure is to be attached is made of wood, for example a large wood beam or a wood floor in a structure. The bolt or connector 175 can be used in conjunction with an internally threaded nut such as the nut 64 shown in FIG. 3. Again the connector 175 can be used to allow an initial position of the structure relative to the support to be adjusted. The hanger bolt 175 comprises an integral connecting member having a first end 178 and an opposite second end 180. A relatively wide section 182 is spaced from these opposite ends and in the exemplary illustrated embodiment is located in a central section of the connector. A first section 190 extends from a first side 185 of the wide section to the first end 178. This first section forms a screw-like thread 192 which tapers to a point at the end 178. An externally threaded second section 184 extends from an opposite second side 186 of the wide section to the second end 180. This second section is made with means for turning the connecting member about a central longitudinal axis thereof. This turning means is indicated generally at 196 in FIG. 18 and, in the illustrated embodiment, comprises a multi-sided end socket that can be engaged by a turning tool, for example an Allen key. It will thus be seen that during use of the connector or hanger bolt 175, the turning means or turning mechanism is engageable with a turning tool to screw the connector into or out of a rigid support in order to adjust the position of the structure from its initial position towards a desired position. A threaded nut, such as the nut 64 shown in FIG. 3, can be threaded onto the second section 184 to secure the structure to the connector. Again, it will be appreciated that a variety of turning means are possible adjacent the second end 180, for example a pair of recesses formed in the side of the second section, a reduced, multi-sided end section that can be engaged by a turning tool such as a wrench or pliers, etc. In the exemplary hanger bolt 175 shown in FIG. 17, the wide section 182 has flat and annular sides at 185, 186.

Figure 19:
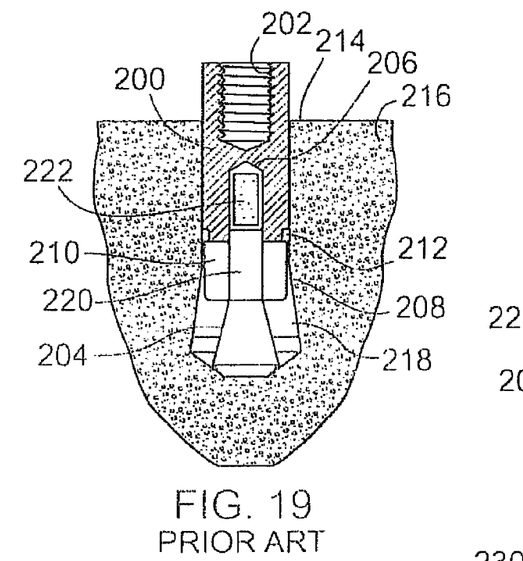
FIG. 19 is an axial cross-section of a prior art anchor in its unexpanded condition.
Figure 20:
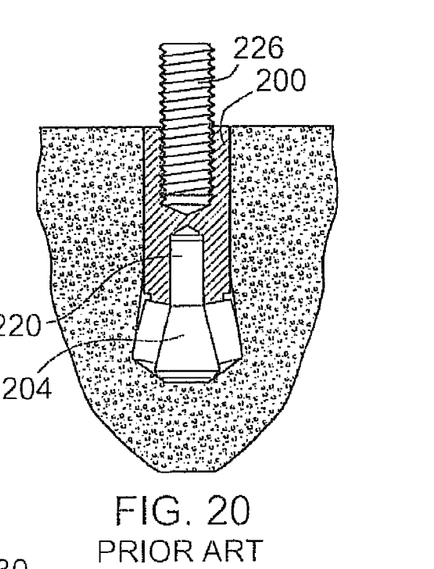
FIG. 20 is an axial cross-section of the anchor of FIG. 19 but in its expanded condition.

FIGS. 19 to 22 illustrate various forms of prior art anchor devices that can be used in place of the anchor member shown in FIG. 3, for example. The prior art anchor illustrated in FIGS. 19 and 20 is described and illustrated in U.S. Pat. No. 4,475,329 issued Oct. 9, 1984 to Artur Fischer. The illustrated fastener includes an expansible anchor 200 provided with an internal thread 202 at its outer end. This fastener also has an expander pin 204. The anchor at its insertion end is formed with an elongate bore 206 which projects beyond a slotted expandable part 208. The part 208 is formed with elongated slots 210 deliminated by a circumferential groove 212 in the longitudinal direction and circumferentially spaced from each other so as to form a plurality of portions which can be radially spread.

The anchor 200 is located in a cylindrical hole 214 which is drilled into the support structure 216 and the end of this hole remote from the point of entry is enlarged in its cross-sectional area as shown at 218 so as to provide abutment surfaces for spreading portions of the anchor as shown in FIG. 20. The length of the bore 206 corresponds approximately to the overall length of the expander pin 204 which includes an expander cone and a shank 220. A capsule 222 is filled with a bonding agent that is inserted into the bore of the anchor before the anchoring step. To anchor this impact fastener, the fastener is inserted into the hole with the expander pin 204 at the base of the undercut. The end face of the expandable anchor is struck so that the part formed with the slots 210 is expanded and at the same time the capsule with the bonding agent is destroyed by the insertion and pressure of the shank of the expander pin. The expander pin and the anchor thus form one unit which does not permit the anchor to be pulled away. FIG. 20 also illustrates how a threaded connector 226 can be threaded into the anchor.

Figure 21:
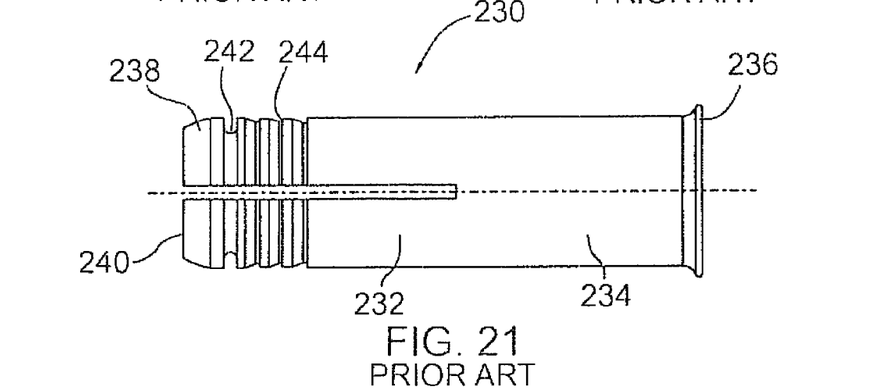
FIG. 21 is a side view of another type of known anchor.

The prior art anchor of FIG. 21 is in the form of an expanding sleeve 230 formed with an expanding skirt 232 that extends from the cylindrical body 234. At one end of the body is a head flange 236 for fitting and holding the anchor in an accommodating hole in the support. The sleeve includes an axial base portion 238 which is deformable in radial compression and which extends between the ends 240 of the sleeve and an annular weakening groove 242. Adjacent the groove is an axial gripping portion 244 provided by peripheral grooves or channels to improve the anchorage of the sleeve in the support. An anchor of this type is described and illustrated in U.S. Pat. No. 6,652,207 issued Nov. 25, 2003 to A. Gauthier. It will be understand that the bore formed in the body portion 234 is tapped or threaded and thus this anchor is also usable in the connecting mechanism of the type illustrated in FIG. 3.

Figure 22:
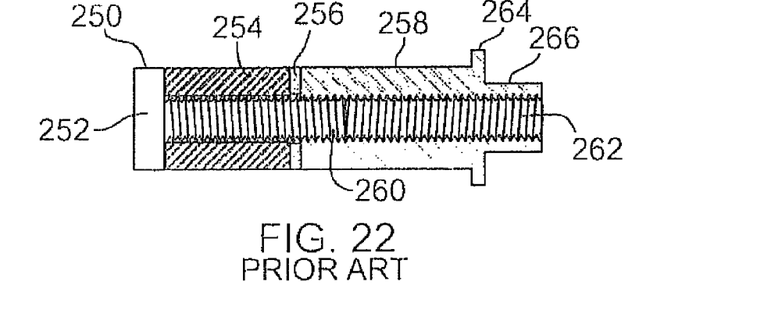
FIG. 22 is a partial cross-sectional view of a known multi-use expansion anchor.

A further type of known anchor that can be used with the connecting mechanism of FIG. 3 is illustrated in FIG. 22. This expansion anchor is described and illustrated in U.S. Pat. No. 7,752,944 issued Jul. 13, 2010 to T. A. Wallek. This multi-use expansion anchor 250 includes a threaded bolt 252, an elastomeric sleeve 254 that the threaded bolt passes through longitudinally, a washer 256 that the threaded bolt passes through longitudinally, and a receiver 258 that the threaded bolt is threaded into and tightened to create the compression of the elastomeric sleeve that holds this anchor device in a rigid substrate. The bolt includes a bolt head portion that is substantially circular and a threaded portion 260 extending from the bolt head. The elastomeric sleeve may have an inner passageway that corresponds to the threaded portion of the bolt. This sleeve may include a rubber material, a polymer material, or a similar resilient material. The receiver 258 includes an inner portion 262 having threads corresponding to the threaded portion of the bolt. The receiver can include a retaining flange 264 that keeps the anchor device from withdrawing into the hole when it is tightened. The receiver can have a hex head 266 that protrudes out from the retaining flange and that can be engaged by a wrench, socket or other tool to rotate the receiver. It will be understood that the thread inside the receiver allows attachment of a threaded connector. This type of anchor is also usable with the type of connecting mechanism illustrated in FIG. 3.

While the present invention has been illustrated and described as embodied in various exemplary embodiments, it is to be understood that the present invention is not limited to the details shown herein, since it will be understood that various omissions, modifications, substitutions and changes in the forms and details of the disclosed connectors and their method of use may be made by those skilled in the art without departing in any way from the spirit and scope of the present invention.

I claim:

1. A threaded connecting mechanism for securing a structure to a support and adjusting the position of the structure relative to the support, said structure including a mounting member with a mounting opening formed therein, said connecting mechanism comprising:

a one piece, elongate anchor member having a passageway formed therein and an expanded bottom end section, said passageway extending to an end of the anchor member and being threaded for at least a portion of its length;

an elongate, one-piece connecting member having first and second opposite ends, a relatively wide section spaced from said opposite ends, a relatively narrow, externally threaded first section extending from a first side of said wide section to the first end, and a relatively narrow, externally threaded second section extending from an opposite second side of the wide section to said second end, said relatively wide section being integrally connected to the externally threaded first and second sections, said first section being threadable into said passageway in order to secure the connecting member to said anchor member, said second section being adapted and sized for insertion through said mounting opening in order to mount said mounting member on said opposite second side of the wide section and being formed with a turning formation for turning said connecting member about a central longitudinal axis thereof, said turning formation being located at said second end; and a threaded nut threadable onto said second section in order to secure said mounting member of the structure to the connecting member, wherein, during use of the connecting mechanism, said turning formation is engageable with a turning tool in order to thread said connecting member into or out of said passageway and thereby adjust the position of the structure.

2. The connecting mechanism of claim 1 wherein said turning formation is a non-circular socket formed in the second end.

3. The connecting mechanism of claim 1 wherein said wide section is approximately midway along the length of the connecting member, said first and second sides of the wide section are flat and annular, and said wide section is unthreaded.

4. The connecting mechanism of claim 1 wherein said first and second sections are threaded in the same manner with the same thread size.

5. A connecting mechanism for securing a structure to a rigid support by means of an internally threaded nut, said mechanism allowing an initial position of the structure relative to the support to be adjusted, said structure being a glass panel having a mounting opening formed therein, said connecting mechanism comprising:

an attachment device consisting of a cylindrical standoff forming a passageway extending to at least one end of the standoff and being at least partially threaded along the length of the passageway; and a one-piece connecting member having first and second opposite ends, a relatively wide section spaced from said opposite ends, a relatively narrow, externally threaded first section extending from a first side of said wide section to said first end, and a relatively narrow, externally threaded second section extending from an opposite second side of said wide section to said second end, said relatively wide section being integrally connected to said first and second sections, said first section being threadable into said passageway to secure the connecting member to said cylindrical standoff, said second section being adapted and sized for insertion through said mounting opening in order to mount said glass panel on said opposite second side of the wide section and formed with means for turning said connecting member about a central longitudinal axis thereof, said turning means being located in the region of said second end, wherein, during use of the connecting mechanism, said turning means is engageable with a turning tool to thread said connecting member into or out of said passageway in order to adjust the position of the glass panel from said initial position towards a desired position, and wherein said threaded nut can be threaded onto said second section to secure the glass panel to the connecting mechanism.

6. The connecting mechanism of claim 5 wherein said turning means is a non-circular socket formed in the second end.

7. The connecting mechanism of claim 5 wherein said wide section is approximately midway along the length of the connecting member, said first and second sides of the wide section are flat and annular, and said wide section is unthreaded.

8. A combination of a threaded connecting mechanism and a concrete support for a structure, said combination for securing a structure to said support and adjusting the position of the structure relative to the concrete support, said structure including a mounting member with a mounting opening thereon, said connecting mechanism comprising:

an anchor member rigidly embedded in said concrete support; extending inwardly from a top surface of said concrete surface, and having a passageway formed therein with an open upper end and threaded for at least a portion of its length, an elongate, one-piece connecting member having first and second opposite ends, a relatively wide section spaced from said opposite ends, a relatively narrow, externally threaded first section extending from a first side of said wide section to the first end, and a relatively narrow, externally threaded second section extending from an opposite second side of the wide section to said second end, said relatively wide section being integrally connected to the externally threaded first and second sections, said first section being threadable into said passageway in order to secure the connecting member to said anchor member, said second section being adapted and sized for insertion through said mounting opening in order to mount said mounting member on said opposite second side of the wide section and being formed with a turning formation for turning said connecting member about a central longitudinal axis thereof, said turning formation being located at said second end; and a threaded nut threadable onto said second section in order to secure said mounting member of the structure to the connecting member, wherein, during use of the connecting mechanism, said turning formation is engageable with a turning tool in order to thread said connecting member into or out of said passageway and thereby adjust the position of the structure without adjusting or moving said anchor member.

9. The connecting mechanism of claim 8 wherein said turning formation is a non-circular socket formed in the second end.

10. The connecting mechanism of claim 9 wherein said wide section is approximately midway along the length of the connecting member, said first and second sides of the wide section are flat and annular, and said wide section is unthreaded.

11. A combination of a connecting mechanism and a fixed support for a panel, said combination for securing the panel to said fixed support by means of a threaded nut and adjusting the position of the panel relative to the fixed support, said panel having a mounting opening, said connecting mechanism comprising:

a cylindrical standoff rigidly attached to said fixed support and forming a passageway extending to an outer end of the standoff and at least partially threaded along its length; and a one-piece connecting member having first and second opposite ends, a relatively wide section spaced from said opposite ends, a relatively narrow, externally threaded first section extending from a first side of said wide section to said first end, and a relatively narrow, externally threaded second section extending from an opposite second side of said wide section to said second end, said relatively wide section being integrally connected to said first and second sections, said first section being threadable into said passageway to secure the connecting member to said cylindrical standoff, said second section being adapted and sized for insertion through said mounting opening in order to mount said glass panel on said opposite second side of the wide section and formed with means for turning said connecting member about a central longitudinal axis thereof, said turning means being located in the region of said second end, wherein, during use of the connecting mechanism, said turning means is engageable with a turning tool to thread said connecting member into or out of said passageway in order to adjust the position of the glass panel from said initial position towards a desired position, and wherein said threaded nut can be threaded onto said second section to secure the glass panel to the connecting mechanism.

12. The connecting mechanism of claim 11 wherein said turning means is a non-circular socket formed in the second end.

13. The connecting mechanism of claim 11 wherein said wide section is approximately midway along the length of the connecting member, said first and second sides of the wide section are flat and annular, and said wide section is unthreaded.

* * * * *